United States Patent
Ebata

(10) Patent No.: US 7,047,323 B2
(45) Date of Patent: May 16, 2006

(54) DATA PROCESSING APPARATUS, DATA PROCESSING METHOD AND DATA RECORDING MEDIUM ON WHICH A DATA PROCESSING PROGRAM THAT CAN BE READ BY A COMPUTER IS RECORDED

(75) Inventor: Toru Ebata, Tokorozawa (JP)

(73) Assignee: Pioneer Corporation, Tokyo-to (JP)

( * ) Notice: Subject to any disclaimer, the term of this patent is extended or adjusted under 35 U.S.C. 154(b) by 99 days.

(21) Appl. No.: 09/925,684

(22) Filed: Aug. 10, 2001

(65) Prior Publication Data

US 2002/0019893 A1   Feb. 14, 2002

(30) Foreign Application Priority Data

Aug. 10, 2000   (JP)   ............................ P2000-243213

(51) Int. Cl.
 *G06F 3/00* (2006.01)
 *G06F 13/12* (2006.01)
(52) U.S. Cl. ..................... 710/10; 710/2; 710/8; 710/62
(58) Field of Classification Search ................... 710/62, 710/63, 8, 10, 14, 15, 17, 18, 19, 71, 72, 710/74, 2
See application file for complete search history.

(56) References Cited

U.S. PATENT DOCUMENTS

| | | | | |
|---|---|---|---|---|
| 5,920,709 | A | * | 7/1999 | Hartung et al. ............. 710/305 |
| 5,954,805 | A | * | 9/1999 | Brusky et al. ................ 710/36 |
| 5,991,842 | A | * | 11/1999 | Takayama ................... 710/105 |
| 6,023,587 | A | * | 2/2000 | Watts et al. .................. 710/72 |
| 6,138,194 | A | * | 10/2000 | Klein et al. ................. 710/302 |
| 6,141,711 | A | * | 10/2000 | Shah et al. ................. 710/302 |
| 6,678,464 | B1 | * | 1/2004 | Kawai et al. ................ 386/94 |
| 2001/0043731 | A1 | * | 11/2001 | Ito et al. ..................... 382/132 |
| 2003/0110333 | A1 | * | 6/2003 | Fuchida ....................... 710/72 |

* cited by examiner

*Primary Examiner*—Tammara Peyton
*Assistant Examiner*—David Martinez
(74) *Attorney, Agent, or Firm*—Sughrue Mion, PLLC

(57) ABSTRACT

A drive apparatus is provided, which is connected via a serial bus to a personal computer. An identification process is performed for identifying the drive apparatus when the serial bus is initialized. Also, the drive apparatus includes a connection-detection unit, a mount-detection unit, and a bus-reset unit. The connection-detection unit detects whether or not the drive apparatus is connected to the personal computer via the serial bus. The mount-detection unit detects whether or not a recording medium is mounted in the drive apparatus while the connection is established. The bus-reset unit resets the serial bus after the recording medium is mounted.

17 Claims, 6 Drawing Sheets

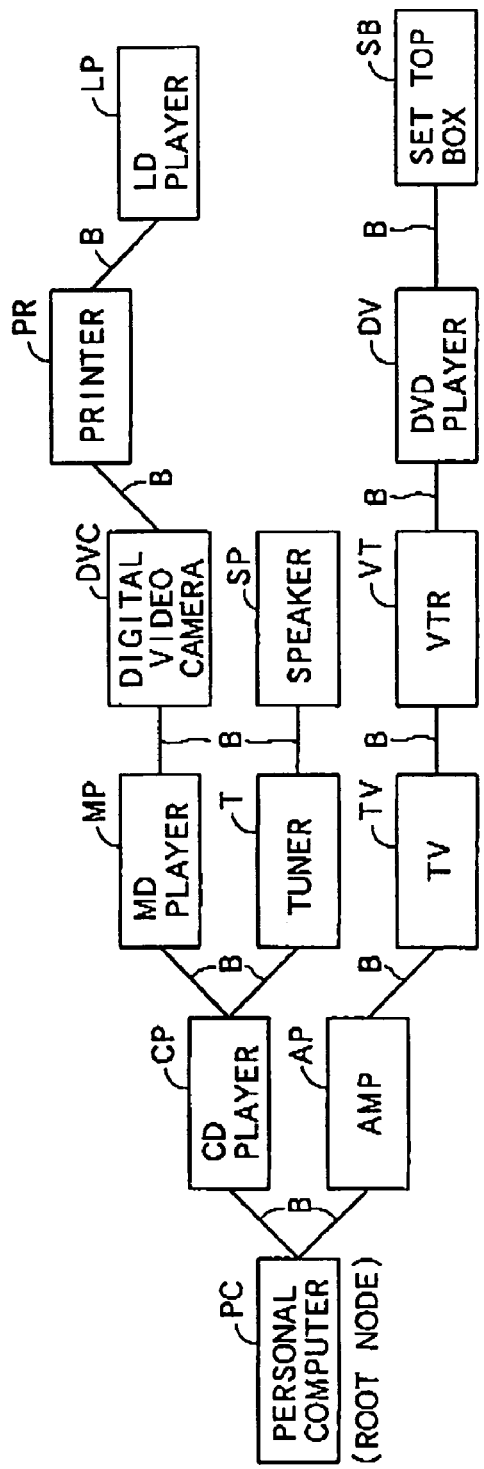
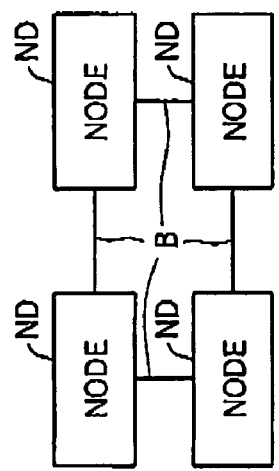
FIG. 1A
FIG. 1B

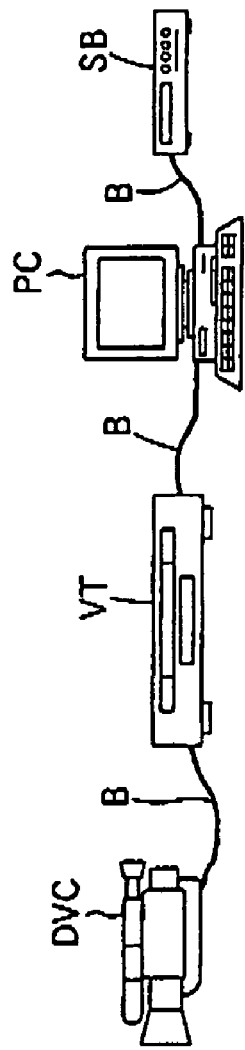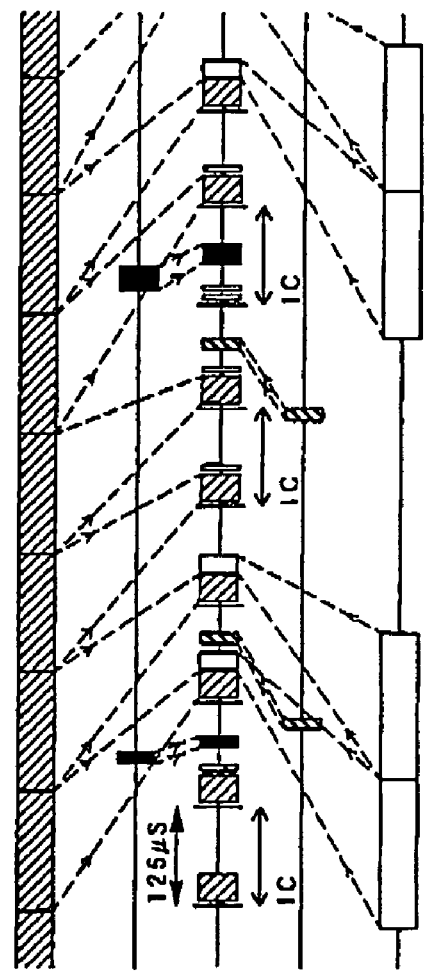

DATA PROCESSING APPARATUS, DATA PROCESSING METHOD AND DATA RECORDING MEDIUM ON WHICH A DATA PROCESSING PROGRAM THAT CAN BE READ BY A COMPUTER IS RECORDED

BACKGROUND OF THE INVENTION

1. Field of the Invention

This invention relates to a data processing apparatus, data processing method and data recording medium on which a data processing program that can be read by a computer is recorded, and more particularly to a data processing apparatus and data processing method that are capable of data exchange with a central processing apparatus, and a data recording medium on which a data processing program for sending and receiving data is recorded 2. Description of the Related Art Recently, the IEEE1394 standard (properly called "IEEE Std. 1394-1995 IEEE Standard for a High Performance Serial Bus") has become commonplace as the standard for transmission networks in which several kinds of data processing devices are connected serially by buses and large amounts of data are transmitted at high speed. Also, there is the SBP (Serial Bus Protocol)-2 standard, which is a standard for controlling data processing devices from a central processing apparatus in a system where the central processing apparatus such as a computer or the like, which uses a serial bus that complies to the IEEE1394 standard, is connected with a data processing apparatus (peripheral device) such as a drive. Based on this SBP-2 standard, it is possible to connect a device such as a hard disc drive (HDD), CD-ROM (Compact Disc-Read Only Memory) drive, or DVD-ROM (DVD-Read Only Memory) drive to a personal computer via a serial bus that complies to the IEEE1394 standard, and in this SBP-2 standard the device that sends data is normally called the initiator, and the device that receives data is normally called the target.

Moreover, in the SBP-2 standard, when transmitting data, first the initiator performs a process called login to create a communication path (channel) with the target. Then, after data transmission is finished, a process called logout is executed by the initiator to cut the currently used channel and terminate the connection with the target.

In the case of connecting a data processing apparatus, such as a CD-ROM drive having an easily replaceable recording medium such as a disk, with the central processing apparatus, a control program (normally called the driver program) for performing control is stored in the central processing apparatus in order to control the data processing apparatus from the central processing apparatus, and depending on the type of recording medium that is mounted in the data processing apparatus, the central processing apparatus is typically configured such that it can control the data processing apparatus by properly using a plurality of control programs.

In another form, the control program may be recorded on a recording medium that is mounted in the data processing apparatus itself, and that program is read and executed by the central processing apparatus in order to control the data processing apparatus.

In this case, in the conventional SBP-2 standard mentioned above, when the recording medium, which is mounted in the data processing apparatus and which is recognized by the central processing apparatus, was changed, it was necessary for the central processing apparatus to continuously check the data processing unit after the aforementioned logout process had been executed and the recording medium had been ejected from the data processing apparatus, as to whether or not another recording medium had been newly mounted in the data processing apparatus. In other words, the central processing apparatus repeatedly logged in to the data processing apparatus, checked whether or not a recording medium had been mounted and logged out from the data processing apparatus until another medium was mounted.

However, in the conventional configuration, since a series of processes was performed in very short periods of time until another recording medium was mounted, there was a problem in that the efficiency and speed of performing processing of a data processing apparatus (for example a HDD, etc.) other than the data processing apparatus, in which the recording medium was mounted, decreased.

Moreover, in the case when three or more data processing devices are connected to a single central processing unit, this problem becomes worse.

SUMMARY OF THE INVENTION

In consideration of the problem mentioned above, the object of the present invention is to provide a data processing apparatus, data processing method and a data recording medium, on which a data processing program for sending and receiving data and which can be read by a computer is recorded, that are capable of lightening the processing burden of the central processing apparatus and speed up processing of other data processing devices when changes in processing conditions occur, such as when the recording medium in a connected data processing apparatus is changed The above object of the present invention can be achieved by a data processing apparatus of the present invention that is used by being connected via a bus device to a central processing apparatus that starts an ID process for identifying the data processing apparatus when the bus device is initialized. The apparatus is provided with: a connection-detection device for detecting whether or not said data processing apparatus is connected to said central processing apparatus via said bus device; a state-change detection device for detecting whether or not the processing state of said data processing apparatus changes while said data processing apparatus is connected to said central processing apparatus; and a bus initialization device for initializing said bus device when change in said processing state is detected.

According to the present invention, by monitoring on the data apparatus side whether or not there are changes in processing, and by resetting the bus when change does occur, it is possible for the central processing apparatus to recognize changes in the data processing apparatus by the bus reset. Therefore, it is not necessary for the central processing apparatus to constantly monitor for changes, and thus making it possible to reduce the processing load of the central processing apparatus and increase the speed of other processing.

In one aspect of the present invention,change in said processing state is the mounting of a data recording medium in said data processing apparatus, said state-change detection device detects whether or not said recording medium is mounted in said data processing apparatus, and said bus initialization device initializes said bus device when said recording medium is mounted in said data processing apparatus.

According to this aspect, by monitoring on the data processing apparatus side whether or not recording medium is mounted, and by resetting the bus when the recording medium is mounted, it is possible for the central processing apparatus to recognize by the reset bus whether or not there is recording medium mounted in the data processing apparatus. Therefore it is not necessary for the central processing apparatus to constantly monitor whether or not there is recording medium, and thus making it possible to reduce the processing load of the central processing apparatus and increase the speed of other processing.

In another aspect of the present invention, said data processing that uses said recording medium performs at least any one of the processes of: outputting data that are recorded on said recording medium to said central processing apparatus via said bus device, and recording data that are output from said central processing apparatus to said recording medium via said bus device.

According to this aspect, it is possible for the central processing apparatus to recognize when the data processing apparatus can perform output processing or recording without increasing the processing load of the central processing apparatus.

In further aspect of the present invention, said bus device is a serial bus complies to the IEEE1394 standard, and said initialization is a bus reset according to the IEEE1394 standard.

According to this aspect, it is possible for the central processing apparatus to accurately recognize when changes occur in processing (mounting of recording medium).

The above object of the present invention can be achieved by a data processing method of the present invention for a data processing apparatus that is used by being connected via a bus device to a central processing apparatus that starts an ID process for identifying the data processing apparatus when the bus device is initialized. The method is provided with: a connection-detection process for detecting whether or not said data processing apparatus is connected to said central processing apparatus via said bus device; a state-change detection process for detecting whether or not the processing state of said data processing apparatus changes while said data processing apparatus is connected to said central processing apparatus; and a bus initialization process for initializing said bus device when change in said processing state is detected.

According to the present invention, by monitoring on the data apparatus side whether or not there are changes in processing, and by resetting the bus when change does occur, it is possible for the central processing apparatus to recognize changes in the data processing apparatus by the bus reset. Therefore, it is not necessary for the central processing apparatus to constantly monitor for changes, and thus making it possible to reduce the processing load of the central processing apparatus and increase the speed of other processing.

In one aspect of the present invention, change in said processing state is the mounting of a data recording medium in said data processing apparatus, said state-change detection process detects whether or not said recording medium is mounted in said data processing apparatus, and said bus initialization process initializes said bus device when said recording medium is mounted in said data processing apparatus.

According to this aspect, by monitoring on the data processing apparatus side whether or not recording medium is mounted, and by resetting the bus when the recording medium is mounted, it is possible for the central processing apparatus to recognize by the reset bus whether or not there is recording medium mounted in the data processing apparatus. Therefore it is not necessary for the central processing apparatus to constantly monitor whether or not there is recording medium, and thus making it possible to reduce the processing load of the central processing apparatus and increase the speed of other processing.

In another aspect of the present invention, said data processing that uses said recording medium performs at least any one of the processes of: outputting data that are recorded on said recording medium to said central processing apparatus via said bus device, and recording data that are output from said central processing apparatus to said recording medium via said bus device.

According to this aspect, it is possible for the central processing apparatus to recognize when the data processing apparatus can perform output processing or recording without increasing the processing load of the central processing apparatus.

In further aspect of the present invention, said bus device is a serial bus that complies to the IEEE1394 standard, and said initialization is a bus reset according to the IEEE1394 standard.

According to this aspect, it is possible for the central processing apparatus to accurately recognize when changes occur in processing (mounting of recording medium).

The above object of the present invention can be achieved by a data recording medium of the present invention, on which a data processing program is recorded capable of being read by a processing computer in a data processing apparatus, which is used by being connected via a bus device to a central processing apparatus that starts an ID process for identifying the data processing apparatus when the bus device is initialized. The program causing the processing computer to function as: a connection-detection device for detecting whether or not said data processing apparatus is connected to said central processing apparatus via said bus device; a state-change detection device for detecting whether or not the processing state of said data processing apparatus changes while said data processing apparatus is connected to said central processing apparatus; and a bus initialization device for initializing said bus device when change in said processing state is detected.

According to the present invention, by monitoring on the data apparatus side whether or not there are changes in processing, and by having the processing computer reset the bus when change does occur, it is possible for the central processing apparatus to recognize changes in the data processing apparatus by the bus reset. Therefore, it is not necessary for the central processing apparatus to constantly monitor for changes, and thus making it possible to reduce the processing load of the central processing apparatus and increase the speed of other processing.

In one aspect of the present invention, change in said processing state is the mounting of a data recording medium for data processing in said data processing apparatus, said state-change detection device detects whether or not said recording medium is mounted in said data processing apparatus, and said bus initialization device initializes said bus device when said recording medium is mounted in said data processing apparatus.

According to this aspect, by monitoring on the data processing apparatus side whether or not recording medium is mounted, and by having the processing computer reset the bus when the recording medium is mounted, it is possible for the central processing apparatus to recognize by the reset bus whether or not there is recording medium mounted in the data processing apparatus. Therefore it is not necessary for the central processing apparatus to constantly monitor whether or not there is recording medium, and thus making it possible to reduce the processing load of the central processing apparatus and increase the speed of other processing.

In another aspect of the present invention, said data processing that uses said recording medium performs at least any one of the processes of: outputting data that are recorded on said recording medium to said central processing apparatus via said bus device, and recording data that are output from said central processing apparatus to said recording medium via said bus device.

According to this aspect, it is possible for the central processing apparatus to recognize when the data processing apparatus can perform output processing or recording without increasing the processing load of the central processing apparatus.

In further aspect of the present invention, said bus device is a serial bus that complies to the IEEE1394 standard, and said initialization is a bus reset according to the IEEE1394 standard.

According to this aspect, it is possible for the central processing apparatus to accurately recognize when changes occur in processing (mounting of recording medium).

BRIEF DESCRIPTION OF THE DRAWINGS

FIG. 1A is a drawing showing an example of an electric product (node) that is connected serially according to the IEEE1394 standard;

FIG. 1B is a drawing showing an example of an electric product (node) that is connected in a loop according to the IEEE1394 standard;

FIGS. 2A and 2B are drawings showing an example of transmission using a serial bus;

DETAILED DESCRIPTION OF THE PREFERRED EMBODIMENT

Figure 3:
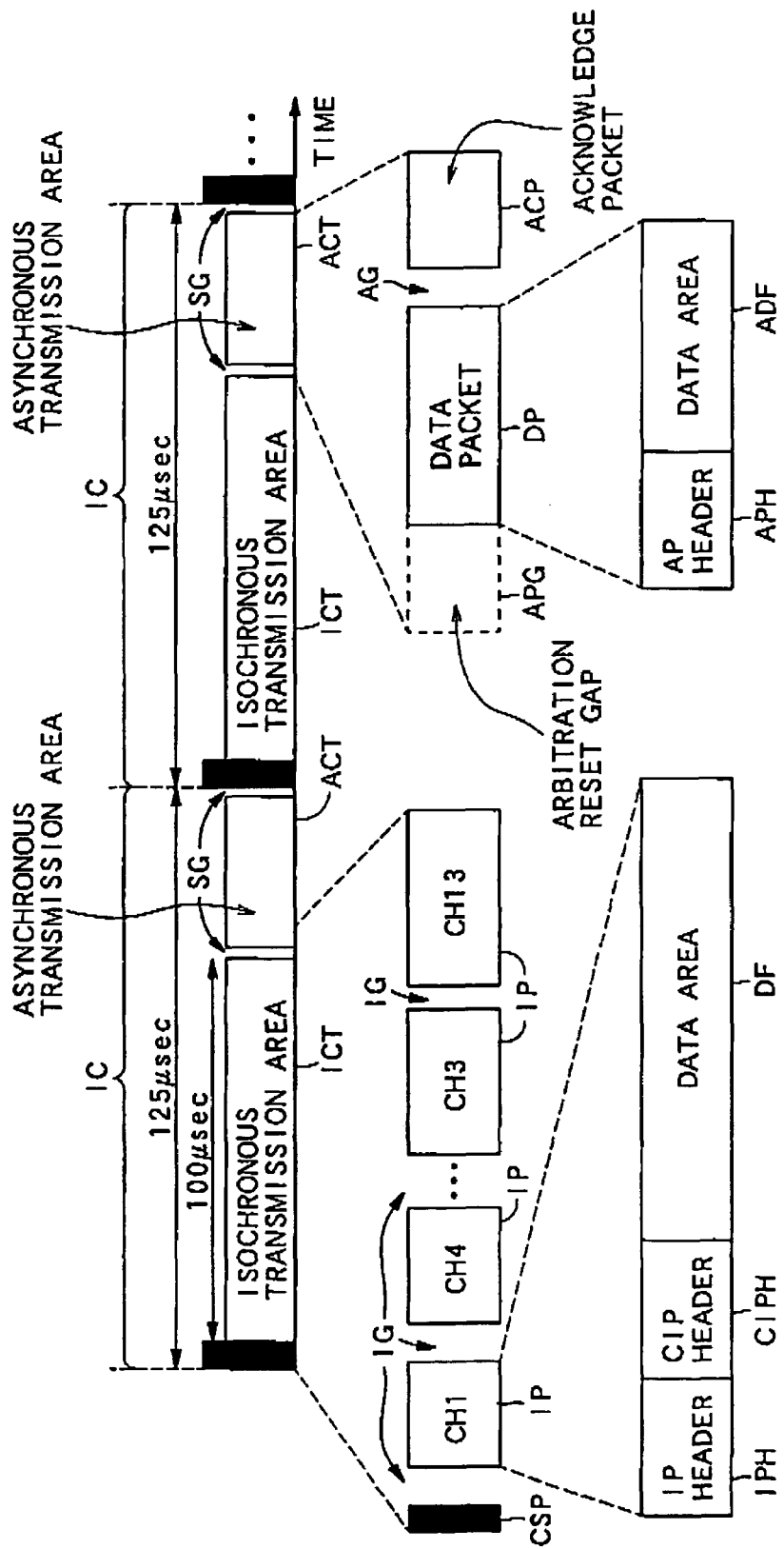
FIG. 3 is a drawing showing an example of the structure of an isochronous cycle.

Next, the preferred embodiment of the present invention will be described based on the drawings.

In the embodiment explained below, the present invention is applied to a drive apparatus as the data processing apparatus, which is connected to a personal computer or central processing apparatus by way of a serial bus that complies to the SBP-2 standard (IEEE1394 standard), and which reads data that are recorded on a CD-ROM and outputs the data to the personal computer for use in processing. (I) IEEE1394 Standard First, before explaining in detail the embodiment of the drive apparatus, a brief explanation of the aforementioned IEEE1394 standard, which is the basis of the aforementioned SBP-2 standard used when connecting the drive to a personal computer, will be given.

Generally, the IEEE1394 standard standardizes data transmission for a plurality of data processing devices (simply called nodes below) that are connected together by a serial bus such that data is transmitted over a plurality of channels between these nodes in a time-sharing system (the IEEE1394 standard standardizes data transmission for a system having a maximum of 63 different channels that are connected by one serial bus).

The IEEE1394 standard (simply called the serial-bus standard below) standardizes initialization of the serial bus, or bus reset, such that the serial bus is reset when another node is newly connected to a group of nodes that are already connected by a serial bus (bus connection), or when a node is disconnected from the aforementioned node group (bus disconnection). Moreover, when the bus is reset, the following process is executed and a new serial-bus connection state is established (the connection state is called topology below).

(1) When a bus reset occurs, the node that detects the bus reset (or in other words, the newly connected node, or the disconnected node) sends a bus reset signal to all of the nodes connected by the serial bus indicating that a bus reset occurred.

(2) Next, after the bus is reset, tree identification is performed in order to connect all of the nodes in a tree connection. The node located at the top of the tree connection is identified as the root node.

(3) Next, the identified root node identifies the unique identification numbers (ID number) that are given to each node so that they can be identified in the tree system.

(4) Next, an IRM (Isochronous Resource Manager) node, or node which manages the communication state (the channels used by each node and transmission occupancy time) of all of the nodes in the formed tree and displays the currently used channels for the other identifiable nodes and the transmission occupancy times for the current nodes, is set.

(5) Finally, a bus manager node, or node that performs overall control of the data transmission state of all the nodes, is set.

After bus reset, a new topology is created by the 5-step process described above.

Also, when actually transmitting data after the topology is created, the transmission node, or node that is trying to start transmission of data, makes an inquiry of the IRM node about the current communication status of the other nodes, and when the channel and transmission occupancy time that the node desires to use is available, the transmission node acquires the right to transmit data and begins transmission (the transmission node secures the channel it will use and the transmission occupancy time). After that, just before transmitting data, the transmission node sends its intention to update the display of the communication status to the IRM node (in other words, since the channel used and transmission occupancy time of the serial bus will change when the transmission node starts data transmission, it is necessary to update the display of the communication status to that after the change), and after the IRM node receives it, the IRM node executes the process for updating the display contents. After this, it becomes possible for the other nodes to reference the updated display contents.

Next, the transmission occupancy time will be summarized.

In the serial bus standard, data from each node are collected and sent in units called isochronous cycles (here a cycle is one time-share cycle on the serial bus). This isochronous cycle contains an isochronous transmission area that contains data (image data or audio data) that are sent in synchronization with data contained in another isochronous cycle, and an isochronous transmission area that contains data (control data for controlling the output of the aforementioned image or audio data) that are unrelated to other data and that are sent asynchronously. Also, data in this isochronous transmission area are divided by time sharing for each different channel, and different data are sent over each respective channel.

The isochronous transmission area is standardized such that the maximum time length of an isochronous transmission area in one isochronous cycle is 100 μsec, and therefore it is necessary that the total time allotted for each channel for data transmission in one isochronous transmission area be 100 μsec or less. The amount of time occupied in an isochronous cycle for transmission of data assigned to one channel is the aforementioned transmission occupancy time.

This transmission occupancy time is also sometimes called the usable bandwidth of the serial bus, and it is also sometimes called the usable capacity of the serial bus. When the length of the isochronous transmission area in one isochronous cycle is less than 100 μsec (including when it is zero), the time in the isochronous cycle other than that for the isochronous transmission area is used mainly as the asynchronous transmission area.

Next, FIG. 1A thru FIG. 3 will be used to explain the serial bus standard in more detail.

FIG. 1A and FIG. 1B are drawings showing one example of topology of the serial bus standard, FIG. 2 is a drawing showing an example of transmission over the serial bus, and FIG. 3 is a drawing showing the structure of an isochronous cycle.

As described above, the serial bus standard is a standard for serially connecting data processing devices, including current and future electrical products, with a serial bus and exchanging data among those devices.

In more detail, settings for each node are performed automatically at the time of connection, and it is possible to connect a new node without having to turn the power OFF.

Moreover, it is possible to transmit data at high speed within a range of 100 Mbps (bits per second) to 400 Mbps, and it is also possible to transmit many kinds of data bi-directionally through realtime transmission, bi-directional transmission and multi-channel transmission.

Furthermore, the connection of nodes can be as shown by the data system J in FIG. 1A, where a personal computer PC is the root node (the node at the top of the tree-shaped topology described above) which is connected to various electrical products or devices, such as a CD (Compact Disc) player CD, MD (Mini Disc) player MP, digital video camera DVC, printer PR, LD (Laser Disc) player LP, tuner T, speakers SP, amp AP, television TV, digital video tape recorder VT, DVD player DV and set-top box for receiving broadcasts SB, via a serial bus B, and these devices are all controlled by the personal computer.

In the serial bus standard, the maximum number of data processing devices (nodes) that can be included in one system (system connected in a tree shape with a serial bus B) is 63, and furthermore, the maximum number of connections between two nodes in one system is 16. Connecting a plurality of nodes in a loop-shaped system as shown in FIG. 1B is prohibited by the serial bus standard.

Next, an example will be used to explain actual transmission in detail.

First, as shown in FIG. 2A, a digital video camera DVC, digital video tape recorder VT, personal computer PC and set-top box SB are connected together as nodes by a serial bus B, and data are transmitted among them. That is, video data are sent over the serial bus B from the digital video camera DVC, specific control commands are sent from the digital video tape recorder VT, similarly, control commands for controlling other devices are sent from the personal computer PC, and image data contained in a received broadcast signal (for example MPEG data compressed according to the MPEG (Moving Picture Expert Group) standard) are sent from the set-top box SB.

In this case, all of the kinds of data that are sent over the serial bus B, are transmitted from the respective nodes and share the serial bus B using time-sharing as shown in FIG. 2B. Moveover, the data fit into synchronized units, or isochronous cycles IC, having a length of 125 μsec, and transmitted over the serial bus B.

Next, FIG. 3 is used to explain the data structure in the aforementioned isochronous cycle IC.

First, as shown in FIG. 3, the isochronous cycle IC comprises a cycle-start packet CSP, which is always inserted at the start of the isochronous cycle in order to match the reference times of each of the nodes, an isochronous transmission area ICT, which comprises isochronous packets IP equal to the number of channels and in which time synchronized data are contained, and an asynchronous transmission area ACT, which contains asynchronous data (for example, various control data and response data corresponding to the control data).

Also, a sub-action gap SG is inserted at the end of each isochronous transmission area ICT and the end of each asynchronous transmission area ACT as a time interval for indicating the end of one isochronous transmission area ICT, or the end of one asynchronous transmission area ACT. Furthermore, an isochronous gap IG is inserted between each isochronous packet IP and between the cycle-start packet and the first isochronous packet IP, as a time interval for indicating the end of the respective packet. The length of the sub-action gap SG is set such that it is longer than the isochronous gap IG.

Next, one isochronous packet IP comprises an IP (Isochronous Packet) header IPH, which contains data indicating the amount of data in the isochronous packet IP and data indicating the channel on which the data in the isochronous packet will be transmitted, a CIP (Common Isochronous Packet) header CIPH, and a data area DF, which contains actual image data or audio data.

On the other hand, the asynchronous transmission comprises arbitration reset gap APG, which is a time interval for a node to indicate its intention to transmit data, a data packet DP, which contains data such as control data that are transmitted asynchronously, and an acknowledge packet ACP, which contains data that is used for a reply from the destination node. Here, an asynchronous gap AG is inserted between the data packet DP and acknowledge packet ACP as a time interval indicating the end of one data packet DP.

Next, one data packet DP comprises an AP (Asynchronous Packet) header APH, which contains data indicating the destination of each data packet DP, and a data area ADF, which contains data indicating the transmission occupancy time that the data packet DP occupies and the asynchronous transmission area ACT and data indicating the channel occupied, or actual control data.

According to the serial bus standard described above, by transmitting control data at high speed from a data processing device such as a personal computer, it is possible to centrally control household appliances or audio-visual equipments such as a DVD player, and it is possible to quickly and accurately transmit data such as image data or audio data between nodes.

Next, the SBP-2 standard, which is based on the serial bus standard described above, will be summarized.

As described above, in the SBP-2 standard, when transmitting data, first a channel is formed between the initiator and target by performing a login process from the initiator, and when transmission of data is complete, the channel between the initiator and target is terminated by performing a logout process from the initiator.

The SBP-2 standard is a so-called transport layer protocol (a layer that provides a data transfer function for various programs (applications), and makes it possible for applications that use that layer to exchange data), and is a standard that takes advantage of the memory bus model features of the IEEE1394 standard, making it possible for the target to receive data at its own convenience. Also, data transfer using the SBP-2 standard is performed by the target writing data to the initiator according to instructions from the initiator.

At this time, the initiator creates a data group called ORB (Operation Request Block) that gives the address where the transmitted data are stored and the size, and sends the target the address of that ORB. When the target receives that ORB, the targets reads the data from the initiator at its own convenience according to the address and size given in the ORB, or writes data, and when processing is finished, the target creates a status block, which indicates the processing status of the target, and sends that to the initiator to notify it of the processing status.

(II) EMBODIMENT

Figure 4:
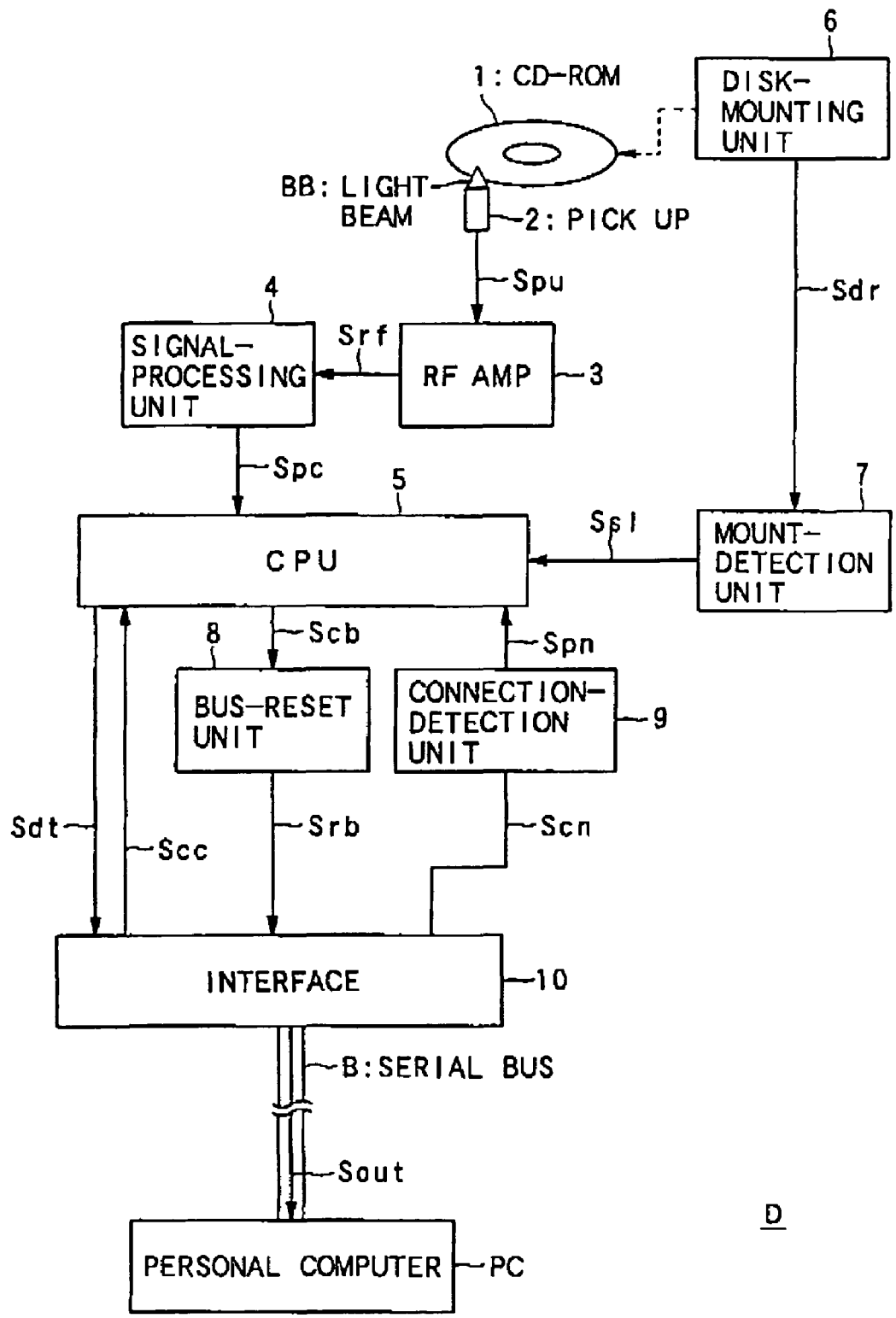
FIG. 4 is a block diagram showing the drive apparatus of an embodiment of this invention.
Figure 5:
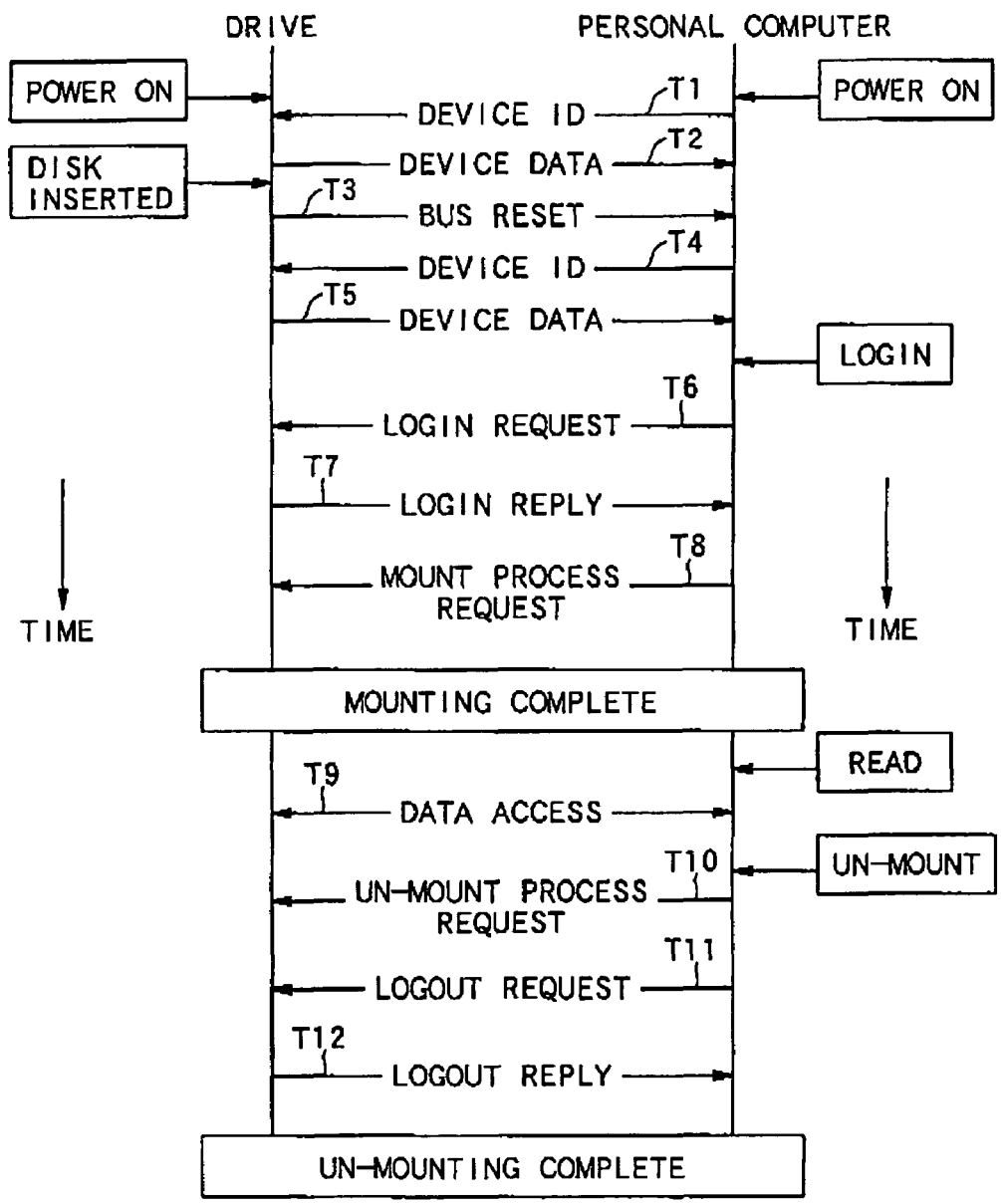
FIG. 5 is a timing chart showing the connection process for the drive apparatus of an embodiment of this invention.
Figure 6:
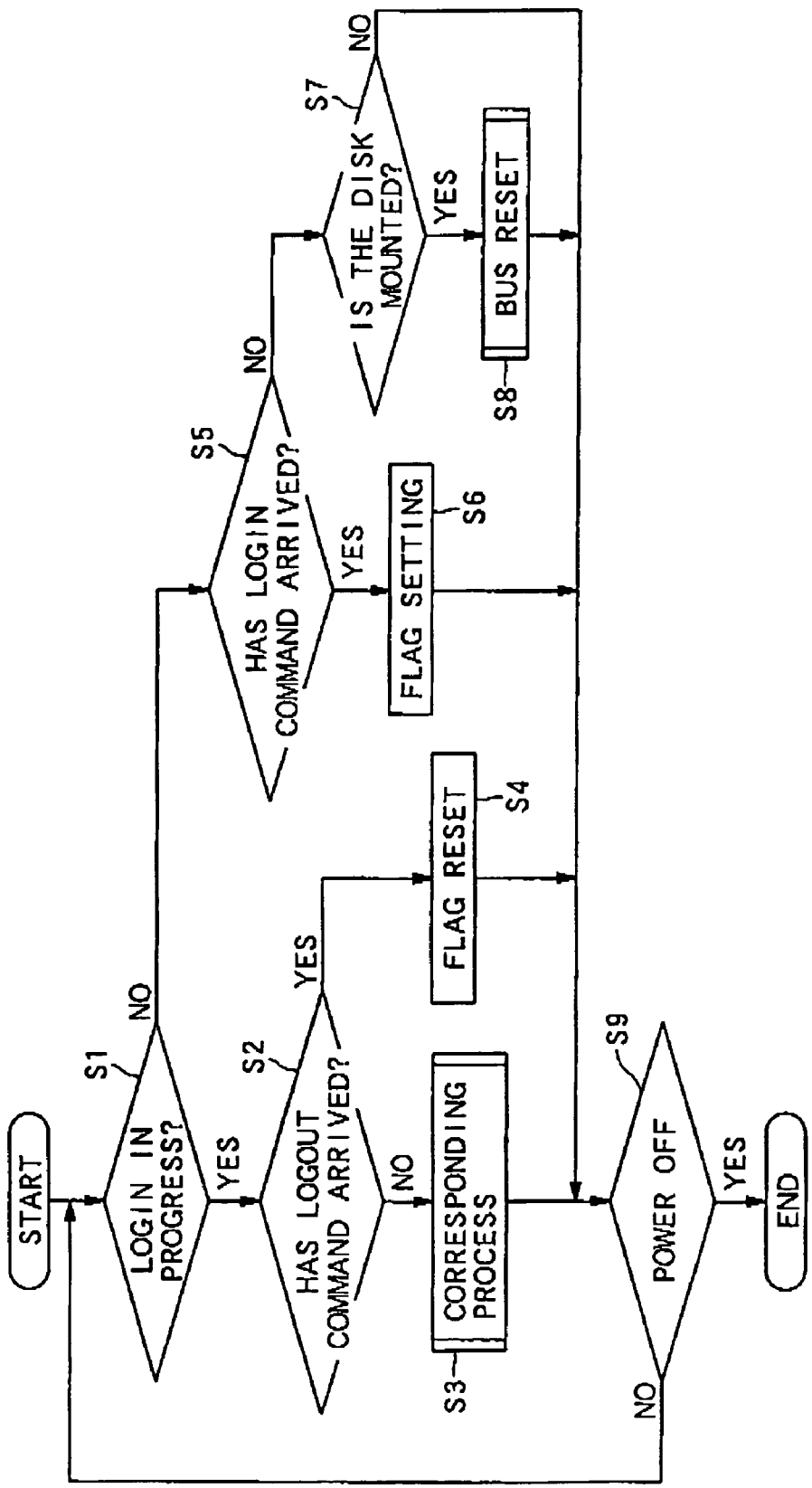
FIG. 6 is a flowchart showing the connection process for the drive apparatus of an embodiment of this invention.

Next, FIG. 4 thru FIG. 6 will be used to explain the preferred embodiment of the present invention.

FIG. 4 is a block diagram showing an overview of the drive device of an embodiment of the invention, FIG. 5 is a timing chart for the general processing of the drive device, and FIG. 6 is a flowchart showing the processing of the drive device.

As shown in FIG. 4, the drive D of this invention is connected to a personal computer PC via a serial bus as the bus that complies to the SBP-2 standard based on the IEEE1394 standard, and is provided with: a pick up 2, a RF (Radio Frequency) amp 3, signal processor 4, CPU 5, disc-mount unit 6, a mount-detection unit 7 as a detection device, a bus-reset unit 8 as a bus initialization device, a connection-detection unit 9 as a connection-detection device, and an interface unit 10 for performing an interface process that complies with the SBP-2 standard.

Next, the operation of each unit will be explained.

First, the disc mount unit 6 moves the CD-ROM1 or recording medium that is inserted into the drive D from the outside, and fixes it to the rotating shaft of a spindle motor not shown in the figure (the spindle motor rotates the CD-ROM1 at a specified rpm), then creates a completion signal Sdr to indicate that the CD-ROM1 has been mounted and outputs that signal to the mount-detection unit 7.

Moreover, the mount-detection unit 7, creates a mount signal Ss1 based on the completion signal Sdr that indicates the CD-ROM1 has been mounted in the drive D, and sends the signal to the CPU5.

On the other hand, after the CD-ROM1 has been mounted, the pick up 2 projects a light beam BB for reproducing the data on to the CD-ROM1 that is rotated by the spindle motor, and creates a detection signal Spu that corresponds with the data recorded on the CD-ROM1 based on the light reflected from the CD-ROM1, then sends that signal to the RF amp 3.

From this, the RF amp 3 performs an amplification process in response to the detection signal Spu to create a RF signal Srf, and then sends that signal to the signal processor 4.

The signal processor 4 performs a waveform shaping process in response to the RF signal, as well as executes a decoding process of the data recorded on the CD-ROM1 based on the RF signal Srf after the waveform has been shaped, then creates a processing signal Spc that contains the decoded data and sends that signal to the CPU 5.

The CPU 5 then outputs the data contained in the process signal Spc to the interface unit 10 as a data signal Sdt.

From this, the interface unit 10 performs the necessary interface process in response to the data signal Sdt, and outputs an output signal Sout, which is to be output to the personal computer PC, and to the serial bus B.

In addition, the interface unit 10 creates a control signal Scc, which contains control data that are output from the personal computer PC via the serial bus B, and outputs that signal to the CPU 5.

Then, based on the control signal Scc, the CPU 5 controls the units which create the data signal Sdt that contains the data desired by the personal computer PC.

On the other hand, in the processing by the drive D in this embodiment, first, when the device ID operation (described later) is executed between the drive D and the personal computer PC, the interface unit 10 creates a connection signal Scn that indicates that the operation has finished and outputs that signal to the connection-detection unit 9.

When the connection signal Scn is received, the connection-detection unit 9 creates a connection-detection signal Spn based on that signal when the power to the personal computer PC and drive D is turned ON to indicate that the personal computer PC and drive D are connected via the serial bus B, then outputs that signal to the CPU 5.

The CPU 5 executes the processing of this embodiment based mainly on the mount signal Ss1 and the connection-detection signal Spn, then creates a reset-control signal Scb for resetting the serial bus B, and outputs that signal to the bus-reset unit 8.

When the bus-reset unit 8 receives the reset-control signal Scb, it creates a reset signal Srb based on this signal for actually resetting the serial bus B, and outputs the signal to the interface unit 10.

From this, the interface unit 10 performs processing which accompanies the aforementioned bus reset and actually resets the serial bus B.

When the personal computer PC detects that a bus reset has occurred, it determines, as described later, whether or not there was a change in processing in the drive or root node (including whether or not a new CD-ROM1 has been mounted).

Next, the process executed by the drive D of the conFIGuration described above to connect to the personal computer PC is explained in general using FIG. 5.

In FIG. 5, the process on the personal computer side and the process on the drive D side are shown to be parallel, however, the time flow in FIG. 5, in any case is from top to bottom.

As shown in FIG. 5, after the power is turned ON to both the personal computer PC and drive D of this embodiment, first, at timing T1, the personal computer PC sends the necessary control signal and executes the device ID process. At this time, the device ID process checks whether or not the drive D is currently and physically connected to the serial bus B, and identifies what devices (CD-ROM drive in this embodiment) are connected and whether or not the connected devices comply to the SBP-2 standard.

Next, at timing T2, after the drive D receives the control signal from the personal computer PC for the aforementioned device ID process, the drive D returns the necessary device data to the personal computer PC giving information about the drive D (in other words, device data that is necessary to respond to the device ID process).

From the two processes described above, the ID process between the personal computer PC and drive D is completed.

After the ID process is complete, the personal computer PC does not execute a process to monitor whether or not the processing status of the drive D is updated (for example a CD-ROM1 is mounted).

When a CD-ROM1 is newly mounted in the drive D after the ID process is complete, the drive D resets the bus, as explained later, and creates a new topology (refer to timing T3 in FIG. 5).

Next, when a new bus reset occurs for the serial bus B, a process identical to the ID process described above (see timing T1 and T2) is executed again (see timing T4 and T5 in FIG. 5).

When the device ID process ends again, both the personal computer PC and drive D are in the ready state until the login process is executed by the personal computer PC.

Next, at timing T6, after the operation has been performed for the personal computer PC to execute the login process, the corresponding login request signal is output from the personal computer PC to the drive D.

Here, the aforementioned login process is different than the mutual ID process in that it is a process for specifying a certain device (for example, the drive D) as the connected party before actually sending data to the device.

After the drive D receives the login request signal, the drive D returns a corresponding login response signal, and the personal computer PC creates a mount-process-request signal for executing the mounting process in the basic program (OS (Operating System)) of the personal computer for identifying the drive D functions, and at timing T8, outputs that signal to the drive D.

This completes the mounting process for making it possible to actually control the drive D from the personal computer PC.

After this mounting process ends, the personal computer PC performs control for reading data from the CD-ROM1 that is currently mounted in the drive D, and at timing T9, the exchange of control signals and data that accompany the signals is executed using an ORB, and the necessary data are obtained by the personal computer PC.

After the necessary data have been obtained, the personal computer PC requests the process to unmount the drive D, and at timing T10 sends an unmount-process-request signal to the drive D.

The unmount process is a process for separating the drive D from the basic program of the personal computer PC after finishing reading data from the drive D.

After the unmount-process-request signal has been sent, the personal computer PC then outputs a logout-request signal to the drive D at timing T11.

The logout process is a process for releasing the drive D that was specified in the login process such that it can be identified by other processing devices.

At timing T12, after the drive D receives the logout-request signal, the drive D returns a logout-response signal to the personal computer PC, and the personal computer PC then ends the unmount process and ends the series of processes for connecting to the drive D.

Next, FIG. 4 thru FIG. 6 will be used to explain the connection process for the drive D of this embodiment.

The connection process shown in FIG. 6 is a connection process that is executed by the drive D centered on the CPU5.

As shown in FIG. 6, in the connection process of this embodiment, first, login processing between the personal computer PC and the drive D is performed (see timing T6 and T7 in FIG. 5) based on the connection-detection signal Spn, then the CPU5 determines whether or not that login process is finished (step S1).

After, the login process is finished (Step S1: Yes), the CPU5 checks whether the logout-request signal (called the logout command, see timing T11 in FIG. 5) has been sent from the personal computer PC (step S2), and when the logout command has not been sent (step S2: No), a process is executed between the CPU5 and the personal computer PC using the currently established connection (step S3), and the CPU5 determines whether or not the power supply to the drive D has been turned OFF (step S9).

When the power has been turned OFF (step S9: Yes), processing ends as is, however, when the power has not been turned OFF (step S9: No), processing returns to step S1 to repeat the aforementioned series of processes.

In the judgment of step S2, when the logout command has been sent (step S2: Yes), the login flag (a flag that indicates whether or not the drive D is logged in with the personal computer PC, and which has a value of '1' when logged in) set in the CPU5 is initialized (the value is set to '0') (step S4) and the CPU5 moves to step S9 and executes the process described above.

On the other hand, in the judgment in step S1, when the login process with the personal computer is not finished (step S1: No), the CPU5 checks whether or not a new login-request signal (called the login command, see timing T6 in FIG. 5) has been sent from the personal computer PC (step S5), and when a new login command has been sent (step S5: Yes), the login flag set in the CPU5 is set to '1' (step S6) and the CPU5 moves to step S9 and executes the process described above.

Furthermore, in the judgment of step S5, when the login command has also not been sent (step S5: No), the CPU5 then, based on the mounting signal Ss1, determines whether or not the mounting process has been executed by the drive D to mount a new CD-ROM1 (step S7), and when the mounting process has not been executed (step S7: No), the CPU5 moves to step S9 as is and executes the process described above, however, when the mounting process has been newly performed (step S7: Yes), then the CPU5 outputs the aforementioned reset-control signal Scb to reset the serial bus B by the bus-reset unit 8 (step S8; see timing T3 in FIG. 5), then moves to step S9 and executes the process described above.

In step S8, in the case of a front loading type drive D in which mounting is performed by using a tray that contains the CD-ROM1 to be mounted in the drive D, the timing at which the bus reset occurs can be at the point when the tray is stored in the drive D, or can be at the point when the type of CD-ROM1 is determined after being mounted.

As explained above, in the connection process for the drive D of this embodiment, at the stage when the login process has not been performed yet, the drive D monitors whether or not a CD-ROM1 is newly mounted in the drive D, and when a CD-ROM1 is newly mounted, the drive D generates a bus reset, so with the occurrence of a bus reset, it is possible for the personal computer PC to identify that mounting has been executed for the drive D, and thus it is not necessary for the personal computer PC to monitor execution of the mounting process, which lightens the processing load of the personal computer PC for one drive D, making it possible increase the speed of processing of other drives.

Moreover, by generating a bus reset automatically after a CD-ROM1 has been mounted, it is possible for the personal computer PC to recognize that reading by the drive D has become possible, without increasing the processing load of the personal computer PC.

Furthermore, since the serial bus B complies with the IEEE1394 standard, it is possible for the personal computer PC to accurately recognize when a CD-ROM1 has been newly mounted.

The embodiment described above is conFIGured such that a bus reset occurs when a CD-ROM1 is mounted before the login process after the mutual ID process has been performed, however, this invention can also be applied to the case when the CD-ROM1 is changed after the login process has finished.

In this case, by forcibly generating a bus reset, even during the login process, it becomes possible for the personal computer PC to recognize a new topology and the mounting of a new CD-ROM1.

Furthermore, the aforementioned embodiment was explained for the case of mounting a CD-ROM1 in the drive D, however, it is also possible construct the embodiment such that a bus reset is generated when other changes in processing occur due to changes in various settings of the drive D, and such that the personal computer PC recognizes the occurrence of that change.

Also, as the drive device connected to the personal computer PC, it is also possible to connect and apply the present invention to drive devices that are also capable of recording instead of the reproduction-only drive D described above. In this case, a bus reset is generated each time a recordable optic disc (for example, a CD-R (CD-Recordable) disc, CD-RW (CD-Rewritable) disc, DVD-R (DVD-Recordable) disc, DVD-RW (DVD-Re-Recordable) disc, DVD-RAM (DVD-Random Access Memory) disc or the like) is mounted in the drive device.

Moreover, it is possible to record a program that corresponds to the flowchart shown in FIG. 6 on flexible disc or hard disc as the data recording medium beforehand, and by having the CPU5 read and execute that program, it is possible to execute processing similar to the connection processing of this embodiment for other drive devices.

The invention may be embodied in other specific forms without departing from the spirit or essential characteristics thereof. The present embodiments are therefore to be considered in all respects as illustrative and not restrictive, the scope of the invention being indicated by the appended claims rather than by the forgoing description and all changes which come within the meaning and range of equivalency of the claims are therefore intended to be embraces therein.

The entire disclosure of Japanese Patent Application No. 2000-243213 filed on Aug. 10, 2000 including the specification, claims, drawings and summary is incorporated herein by reference in its entirety.

What is claimed is:

1. A data processing apparatus that is used by being connected via a bus device to a central processing apparatus that starts an ID process for identifying the data processing apparatus when the bus device is initialized, the apparatus comprising:
   a connection-detection device for detecting whether or not said data processing apparatus is connected to said central processing apparatus via said bus device;
   a state-change detection device for detecting whether or not a data recording medium which is to be mounted in said data processing apparatus, is mounted in said data processing apparatus while said data processing apparatus is connected to said central processing apparatus; and
   a bus initialization device for initializing all bus devices which are connected to a bus when said data recording medium is mounted in said data processing apparatus.

2. The data processing apparatus according to claim 1 wherein
   said state-change detection device detects whether or not said data recording medium is mounted in said data processing apparatus, and
   said bus initialization device initializes said all bus devices when said data recording medium is mounted in said data processing apparatus.

3. The data processing apparatus according to claim 2, wherein
   said data processing that uses said data recording medium performs at least any one of the processes of:
   outputting data that are recorded on said data recording medium to said central processing apparatus via said bus device, and
   recording data that are output from said central processing apparatus to said data recording medium via said bus device.

4. The data processing apparatus according to claim 1, wherein
   said bus device is a serial bus that complies with the IEEE 1394 standard, and
   said initialization is a bus reset according to the IEEE 1394 standard.

5. A data processing method for a data processing apparatus that is used by being connected via a bus device to a central processing apparatus that starts an ID process for identifying the data processing apparatus when the bus device is initialized, the method comprising:
   a connection-detection process for detecting whether or not said data processing apparatus is connected to said central processing apparatus via said bus device;
   a state-change detection process for detecting whether or not a data recording medium which is to be mounted in said data processing apparatus is mounted in said data processing apparatus while said data processing apparatus is connected to said central processing apparatus; and
   a bus initialization process for initializing all bus devices which are connected to said bus when said data recording medium is mounted in said data processing apparatus.

6. The data processing method according to claim 5, wherein
   said state-change detection process detects whether or not said data recording medium is mounted in said data processing apparatus, and
   said bus initialization process initializes said all bus devices when said data recording medium is mounted in said data processing apparatus.

7. The data processing method according to claim 6, wherein
   said data processing that uses said data recording medium performs at least any one of the processes of:
   outputting data that are recorded on said data recording medium to said central processing apparatus via said bus device, and
   recording data that are output from said central processing apparatus to said data recording medium via said bus device.

8. The data processing method according to claim 5, wherein
said bus device is a serial bus that complies with the IEEE 1394 standard, and
said initialization is a bus reset according to the IEEE 1394 standard.

9. A data recording medium, on which a data processing program is recorded capable of being read by a processing computer in a data processing apparatus, which is used by being connected via a bus device to a central processing apparatus that starts an ID process for identifying the data processing apparatus when the bus device is initialized, the program causing the processing computer to function as:
a connection-detection device for detecting whether or not said data processing apparatus is connected to said central processing apparatus via said bus device;
a state-change detection device for detecting whether or not a data recording medium which is to be mounted in said data processing apparatus, is mounted in said data processing apparatus while said data processing apparatus is connected to said central processing apparatus; and
a bus initialization device for initializing all bus devices which are connected to said bus when said data recording medium is mounted in said data processing apparatus is detected.

10. The data recording medium according to claim 9, wherein
said state-change detection device detects whether or not said data recording medium is mounted in said data processing apparatus, and
said bus initialization device initializes said all bus devices when said data recording medium is mounted in said data processing apparatus.

11. The data recording medium according to claim 9, wherein
said data processing that uses said data recording medium performs at least any one of the processes of:
outputting data that are recorded on said data recording medium to said central processing apparatus via said bus device, and
recording data that are output from said central processing apparatus to said data recording medium via said bus device.

12. The data recording medium according to claim 9, wherein
said bus device is a serial bus that complies with the IEEE 1394 standard, and
said initialization is a bus reset according to the IEEE 1394 standard.

13. A data processing apparatus that is used by being connected via a bus device to a central processing apparatus that starts an ID process for identifying the data processing apparatus when the bus device is initialized, the apparatus comprising:
a connection-detection device for detecting whether or not said data processing apparatus is connected to said central processing apparatus via said bus device;
a state-change detection device for detecting whether or not a recording medium is mounted in said data processing apparatus, while said data processing apparatus is connected to said central processing apparatus; and
a bus initialization device for initializing all bus devices which are connected to said bus when said recording medium is mounted in said data processing apparatus.

14. The data processing apparatus according to claim 13, wherein said data processing that uses said recording medium performs at least any one of the process of:
outputting data that are recorded on said recording medium to said central processing apparatus via said bus device, and
recording data that are output from said central processing apparatus to said recording medium via said bus device.

15. A data processing method for a data processing apparatus that is used by being connected via a bus device to a central processing apparatus that starts an ID process for identifying the data processing apparatus when the bus device is initialized, comprising:
a connection-detection process for detecting whether or not said data processing apparatus is connected to said central processing apparatus via said bus device;
a state-change detection process for detecting whether or not a recording medium is mounted in said data processing apparatus, while said data processing apparatus is connected to said central processing apparatus; and
a bus initialization process for initializing said all bus devices when said recording medium is mounted in said data processing apparatus.

16. The data processing method according to claim 15, wherein said data processing that uses said recording medium performs at least any one of the processes of:
outputting data that are recorded on said recording medium to said central processing apparatus via said bus device, and
recording data that are output from said central processing apparatus to said recording medium via said bus device.

17. A data recording medium, on which a data processing program is recorded capable of being read by a processing computer in a data processing apparatus, which is used by being connected via a bus device to a central processing apparatus that starts an ID process for identifying the data processing apparatus when the bus device is initialized, the program causing the processing computer to function as:
a connection-detection device for detecting whether or not said data processing apparatus is connected to said central processing apparatus via said bus device;
a state-change detection device for detecting whether or not a recording medium is mounted in said data processing apparatus while said data processing apparatus is connected to said central processing apparatus; and
a bus initialization device initializing said all bus devices when said recording medium is mounted in said data processing apparatus.

* * * * *